United States Patent
Noh et al.

(10) Patent No.: US 9,622,226 B2
(45) Date of Patent: *Apr. 11, 2017

(54) DATA TRANSMISSION METHOD AND DEVICE IN WIRELESS COMMUNICATION SYSTEM

(71) Applicant: LG Electronics Inc., Seoul (KR)

(72) Inventors: Min Seok Noh, Anyang-si (KR); Jae Hoon Chung, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,014

(22) Filed: Jan. 29, 2016

(65) Prior Publication Data

US 2016/0150529 A1    May 26, 2016

Related U.S. Application Data

(63) Continuation of application No. 13/578,486, filed as application No. PCT/KR2011/000971 on Feb. 14, 2011, now Pat. No. 9,276,659.

(Continued)

(30) Foreign Application Priority Data

Feb. 11, 2011  (KR) .................. 10-2011-0012298

(51) Int. Cl.
   *H04L 12/26*    (2006.01)
   *H04W 72/04*    (2009.01)
   (Continued)

(52) U.S. Cl.
   CPC ........ *H04W 72/0413* (2013.01); *H04B 7/155* (2013.01); *H04L 5/001* (2013.01);
   (Continued)

(58) Field of Classification Search
   CPC ........ H04W 52/32; H04W 52/34; H04B 7/26; H04B 7/155; H04L 5/001; H04L 5/0053; H04L 5/0048; H04L 5/0007
   See application file for complete search history.

(56) References Cited

U.S. PATENT DOCUMENTS 8,224,372 B2    7/2012  Pedersen et al.
8,467,367 B2 *  6/2013  Malladi ................. H04L 1/0004
                                                            370/343
(Continued)

FOREIGN PATENT DOCUMENTS

CN    101606327 A    12/2009
CN    101617482 A    12/2009
(Continued)

OTHER PUBLICATIONS

"UL Sounding RS for E-UTRA," 3GPP TSG RAN WG1 #50 R1-073757, Motorola, Aug. 20-24, 2007, pp. 1-8.

(Continued)

*Primary Examiner* — Chandrahas Patel
*Assistant Examiner* — Lan Huong Truong
(74) *Attorney, Agent, or Firm* — Birch, Stewart, Kolasch & Birch, LLP

(57) ABSTRACT

A method and a user equipment (UE) are provided for transmitting uplink data in a wireless communication system. Uplink data is mapped to resource elements corresponding to a physical uplink shared channel (PUSCH) in a UE-specific aperiodic sounding reference signal (SRS) subframe. The UE-specific aperiodic SRS subframe includes a single carrier frequency division multiple access (SC-FDMA) symbol reserved for an aperiodic SRS. The aperiodic SRS is transmitted in the reserved SC-FDMA symbol when triggered by a base station. The uplink data is not mapped to the SC-FDMA symbol reserved for the aperiodic SRS regardless of whether the aperiodic SRS is transmitted (Continued)

in the reserved SC-FDMA symbol or not. The mapped uplink data is transmitted to the base station via the UE-specific aperiodic SRS subframe.

18 Claims, 15 Drawing Sheets

Related U.S. Application Data

(60) Provisional application No. 61/303,674, filed on Feb. 12, 2010, provisional application No. 61/394,360, filed on Oct. 19, 2010, provisional application No. 61/405,184, filed on Oct. 20, 2010, provisional application No. 61/409,096, filed on Nov. 1, 2010, provisional application No. 61/409,531, filed on Nov. 2, 2010, provisional application No. 61/415,338, filed on Nov. 18, 2010, provisional application No. 61/415,354, filed on Nov. 19, 2010, provisional application No. 61/415,747, filed on Nov. 19, 2010, provisional application No. 61/427,484, filed on Dec. 28, 2010.

(51) Int. Cl.
  *H04B 7/155* (2006.01)
  *H04L 5/00* (2006.01)
  *H04L 27/26* (2006.01)

(52) U.S. Cl.
  CPC .......... *H04L 5/0007* (2013.01); *H04L 5/0048* (2013.01); *H04L 5/0053* (2013.01); *H04L 27/26* (2013.01)

(56) References Cited

U.S. PATENT DOCUMENTS

| | | | |
|---|---|---|---|
| 2008/0200203 A1 | 8/2008 | Malladi et al. | |
| 2009/0073922 A1* | 3/2009 | Malladi | H04L 1/0004 370/328 |
| 2009/0168714 A1 | 7/2009 | Tanaka et al. | |
| 2009/0232118 A1 | 9/2009 | Wang et al. | |
| 2009/0238241 A1 | 9/2009 | Hooli et al. | |
| 2009/0285193 A1 | 11/2009 | Kim et al. | |
| 2010/0118807 A1* | 5/2010 | Seo | H04W 72/042 370/329 |
| 2010/0195624 A1* | 8/2010 | Zhang | H04L 1/1861 370/335 |
| 2010/0246561 A1* | 9/2010 | Shin | H04W 52/32 370/345 |
| 2011/0199944 A1* | 8/2011 | Chen | H04L 5/0007 370/280 |
| 2014/0036859 A1 | 2/2014 | Ekpenyong et al. | |

FOREIGN PATENT DOCUMENTS

| | | |
|---|---|---|
| EP | 2 104 257 A2 | 9/2009 |
| WO | WO 2008/120925 A1 | 10/2008 |
| WO | WO 2009/107985 A1 | 9/2009 |
| WO | WO 2009/116789 A1 | 9/2009 |
| WO | WO 2011/083746 A1 | 7/2011 |
| WO | WO 2011/100466 A2 | 8/2011 |

OTHER PUBLICATIONS

Ericsson, ST Ericsson, "On Sounding Reference Signal Enhancements", TSG-RAN WG1 #59bis, Valencia, Spain, Jan. 18-22, 2010, R1-100056.

Motorola, "Benefit of Non-Persistent UL Sounding for Frequency Hopping PUSCH", 3GPP TSG RAN WG1 Meeting #50, R1-073756, Athens, Greece, Aug. 20-24, 2007, pp. 1-4.

Motorola, "Benefit of Non-Persistent UL Sounding for Frequency Hopping PUSCH," 3GPP TSG RAN WG1 Meeting #50, Agenda Item 7.2.2, R1-073756, Athens, Greece, Aug. 20-24, 2007, 4 pages.

Motorola, "Multiplexing of SRS and PUSCH", 3GPP TSG RAN WG1 Meeting #52, R1-080723, Sorrento, Italy, Feb. 11-15, 2008, pp. 1-4.

QUALCOMM Europe, "Multiplexing of Sounding RS and PUCCH," 3GPP TSG RAN1 #49-bis, Agenda Item 5.13.2, R1-072756, Jun. 25-29, 2007, Orlando, Florida, USA, 6 pages.

* cited by examiner

DATA TRANSMISSION METHOD AND DEVICE IN WIRELESS COMMUNICATION SYSTEM

CROSS REFERENCE TO RELATED APPLICATIONS

This application is a Continuation of U.S. application Ser. No. 13/578,486, filed on Aug. 10, 2012 (now U.S. Pat. No. 9,276,659 issued Mar. 1, 2016), which is the National Phase of PCT/KR2011/000971 filed on Feb. 14, 2011, which claims priority under 35 U.S.C. 119(e) to U.S. Provisional Application No. 61/303,674 filed on Feb. 12, 2010, 61/394,360 filed on Oct. 19, 2010, 61/405,184 filed on Oct. 20, 2010, 61/409,096 filed Nov. 1, 2010, 61/409,531 filed Nov. 2, 2010, 61/415,338 filed Nov. 18, 2010, 61/415,354 filed on Nov. 19, 2010, 61/415,747 filed on Nov. 19, 2010 and 61/427,484 filed on Dec. 28, 2010 and under 35 U.S.C. 119(a) to Patent Application No. 10-2011-0012298 filed in Republic of Korea on Feb. 11, 2011, all of which are hereby expressly incorporated by reference into the present application.

BACKGROUND OF THE INVENTION

The present invention relates to wireless communication and, more specifically, to a data transmission method and apparatus in a wireless communication system.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h}=y/p=h+n/p=h+\hat{n} \quad \text{[Equation 1]}$$

The accuracy of the channel estimation value $\hat{h}$ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

An uplink RS may be divided into a demodulation reference signal (DMRS) and a sounding reference signal (SRS). The DMRS is an RS used in channel estimation for demodulating a received signal. The DMRS may be combined with the transmission of a PUSCH or a PUCCH. The SRS is an RS transmitted from UE to a BS for uplink scheduling. The BS estimates an uplink channel through a received SRS and uses the estimated uplink channel in uplink scheduling.

Meanwhile, an SRS may be periodically transmitted or may be trigged by a BS when the BS needs to transmit an SRS and aperiodically transmitted. A subframe configured to transmit an SRS may be previously determined, and uplink data may be transmitted in a relevant subframe through a physical uplink shared channel (PUSCH).

If the transmission of an SRS and the transmission of uplink data through a PUSCH are configured so that they are performed in one subframe, there is a need for a method of performing the transmission efficiently.

SUMMARY OF THE INVENTION

The present invention provides a data transmission method and apparatus in a wireless communication system.

In an aspect, a data transmission method by a user equipment (UE) in a wireless communication system is provided. The data transmission method includes transmitting a sounding reference signal (SRS) and uplink data on a physical uplink shared channel (PUSCH) in an SRS subframe, wherein a single carrier-frequency division multiple access (SC-FDMA) symbol allocated to the SRS and an SC-FDMA symbol allocated to the PUSCH do not overlap with each other within the SRS subframe.

The SRS subframe may be one of a plurality of UE-specific SRS subframes configured by a UE-specific aperiodic SRS parameter.

The UE-specific aperiodic SRS parameter may indicate a periodicity and an offset of the plurality of UE-specific SRS subframes.

The UE-specific aperiodic SRS parameter may be given by a higher layer.

The plurality of UE-specific SRS subframes may be a subset of a plurality of cell-specific SRS subframes configured by a cell-specific SRS parameter.

The SRS subframe may be one of a plurality of cell-specific SRS subframes configured by a cell-specific SRS parameter.

The PUSCH may be subject to rate matching except the SC-FDMA symbol allocated to the SRS.

The SC-FDMA symbol allocated to the SRS may be a last SC-FDMA symbol of the SRS subframe.

A bandwidth of some of or all SC-FDMA symbols allocated to the SRS may be allocated for a transmission of the SRS.

In another aspect, a resource mapping method in a wireless communication system is provided. The resource mapping method includes mapping physical resource blocks assigned for physical uplink shared channel (PUSCH) transmission, to corresponding resource elements (REs) within a subframe, wherein the REs are not included in a single carrier-frequency division multiple access (SC-FDMA) symbol reserved for aperiodic sounding reference signal (SRS) transmission.

The subframe may be one of a plurality of UE-specific SRS subframes configured by a UE-specific aperiodic SRS parameter.

The UE-specific aperiodic SRS parameter may indicate a periodicity and an offset of the plurality of UE-specific SRS subframes.

The UE-specific aperiodic SRS parameter may be given by a higher layer.

The plurality of UE-specific SRS subframes may be a subset of a plurality of cell-specific SRS subframes configured by a cell-specific SRS parameter.

The SRS subframe may be one of a plurality of cell-specific SRS subframes configured by a cell-specific SRS parameter.

The PUSCH may be subject to rate matching except the SC-FDMA symbol allocated to the aperiodic SRS.

The SC-FDMA symbol allocated to the aperiodic SRS may be a last SC-FDMA symbol of the SRS subframe.

The resource mapping method may further include transmitting the aperiodic SRS through the SC-FDMA symbol allocated to the aperiodic SRS.

In another aspect, a user equipment in a wireless communication system is provided. The user equipment includes a radio frequency (RF) unit transmitting a sounding reference signal (SRS) and uplink data on a physical uplink shared channel (PUSCH) in an SRS subframe, and a processor connected to the RF unit, wherein a single carrier-frequency division multiple access (SC-FDMA) symbol allocated to the SRS and an SC-FDMA symbol allocated to the PUSCH do not overlap with each other within the SRS subframe.

If an aperiodic SRS triggered by a BS and a physical uplink shared channel (PUSCH) are configured so that they are transmitted in one subframe, uplink resources can be efficiently allocated and reliability of SRS transmission can also be maintained.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
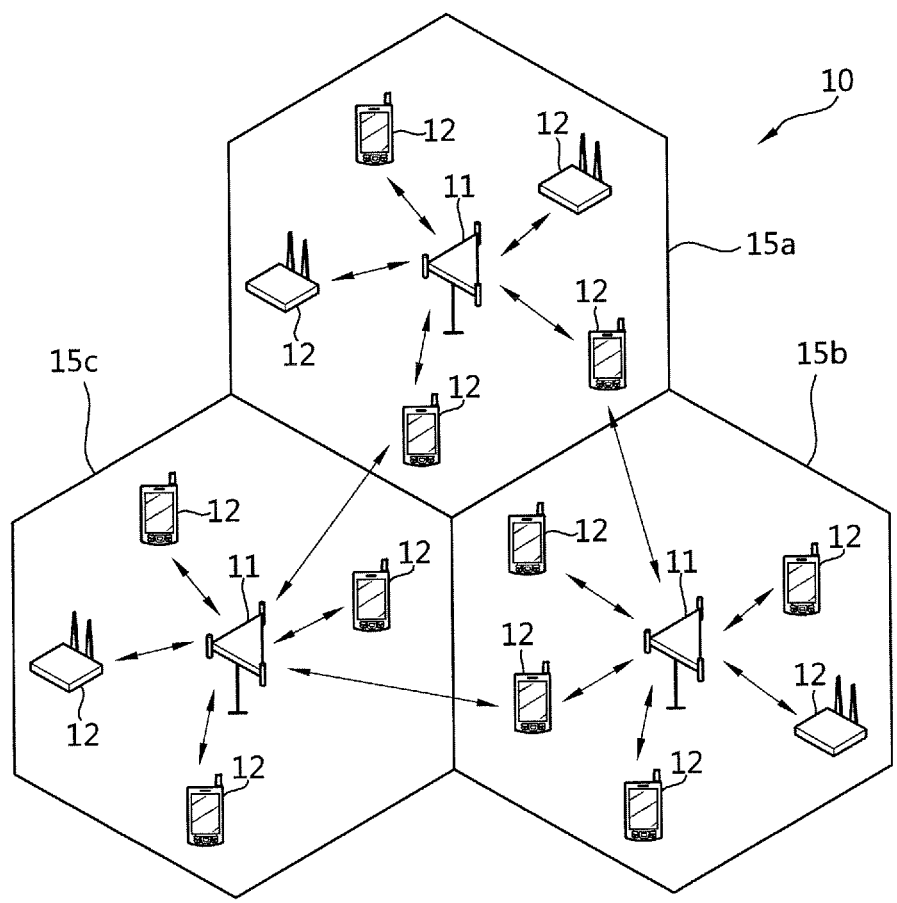
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
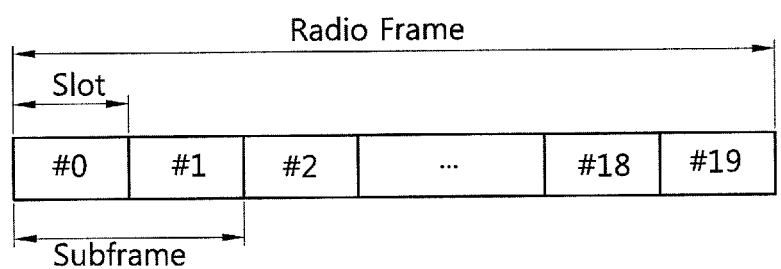
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
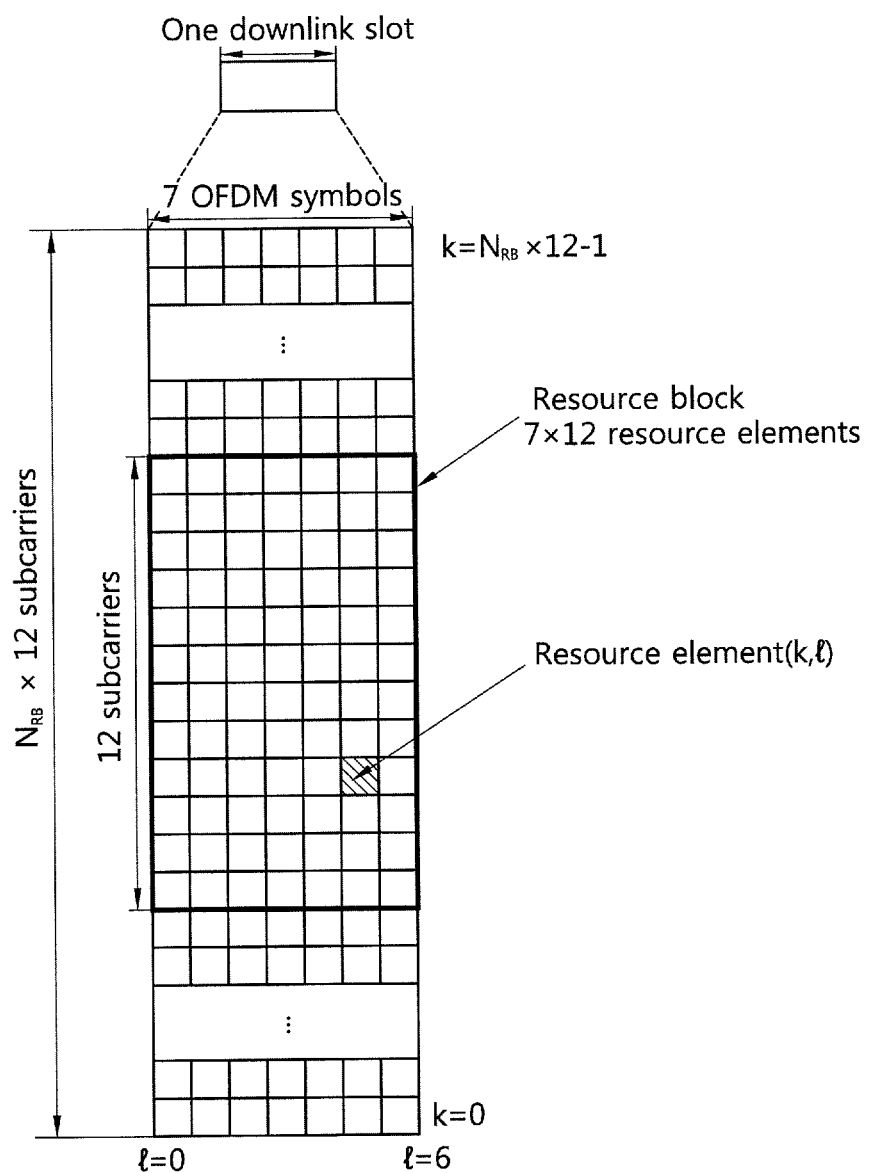
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and 1 is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
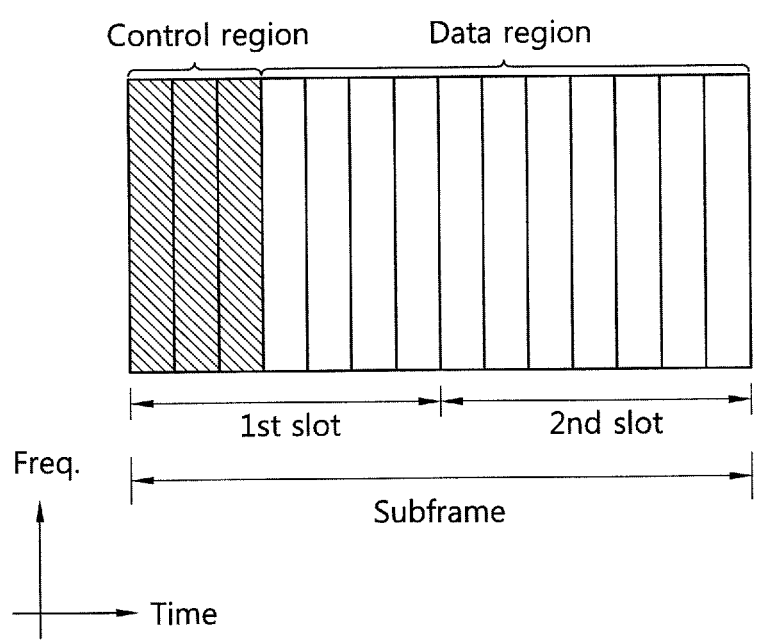
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
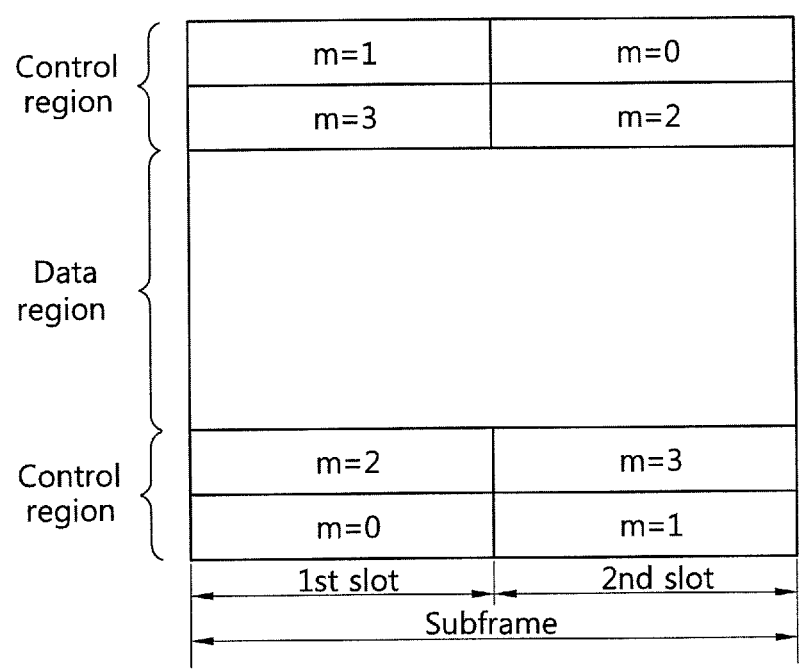
FIG. 5 shows the structure of an uplink subframe.
Figure 5:
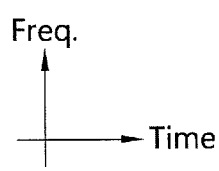

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

3GPP LTE-A supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other tennis such as a bandwidth aggregation system or the like. The carrier aggregation system can be divided into a contiguous carrier aggregation system in which carriers are contiguous to each other and a non-contiguous carrier aggregation system in which carriers are separated from each other. In the contiguous carrier aggregation system, a guard band may exist between CCs. A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE rel-8 UE can transmit or receive only one carrier when each of carriers constituting the carrier aggregation system is compatible with an LTE rel-8 system. Therefore, when the number of carriers used in uplink is equal to the number of carriers used in downlink, it is necessary to configure such that all CCs are compatible with LTE rel-8.

In order to efficiently use the plurality of carriers, the plurality of carriers can be managed in a media access control (MAC). To transmit/receive the plurality of carriers, a transmitter and a receiver both have to be able to transmit/receive the plurality of carriers.

Figure 6:
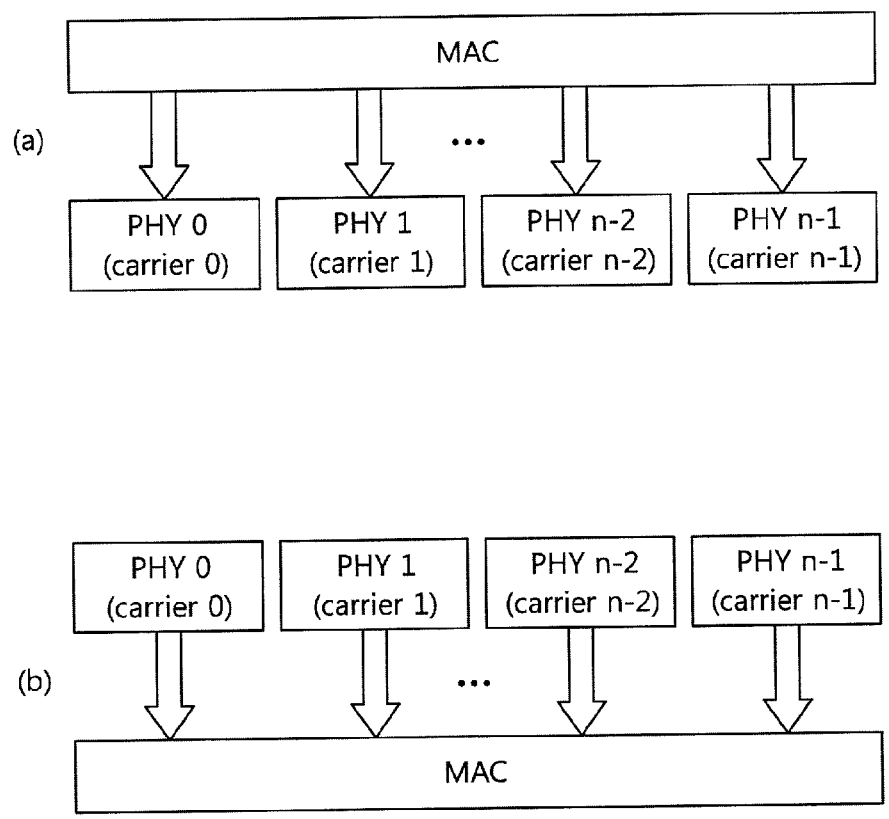
FIG. 6, including (a) and (b), shows an example of a transmitter and a receiver which constitute a carrier aggregation system.

FIG. 6, including (a) and (b), shows an example of a transmitter and a receiver which constitute a carrier aggregation system.

In the transmitter of FIG. 6(a), one MAC transmits and receives data by managing and operating all of n carriers. This is also applied to the receiver of FIG. 6(b). From the perspective of the receiver, one transport block and one HARQ entity may exist per CC. A UE can be scheduled simultaneously for a plurality of CCs. The carrier aggregation system of FIG. 6 can apply both to a contiguous carrier aggregation system and a non-contiguous carrier aggregation system. The respective carriers managed by one MAC do not have to be contiguous to each other, which results in flexibility in terms of resource management.

Figure 7:
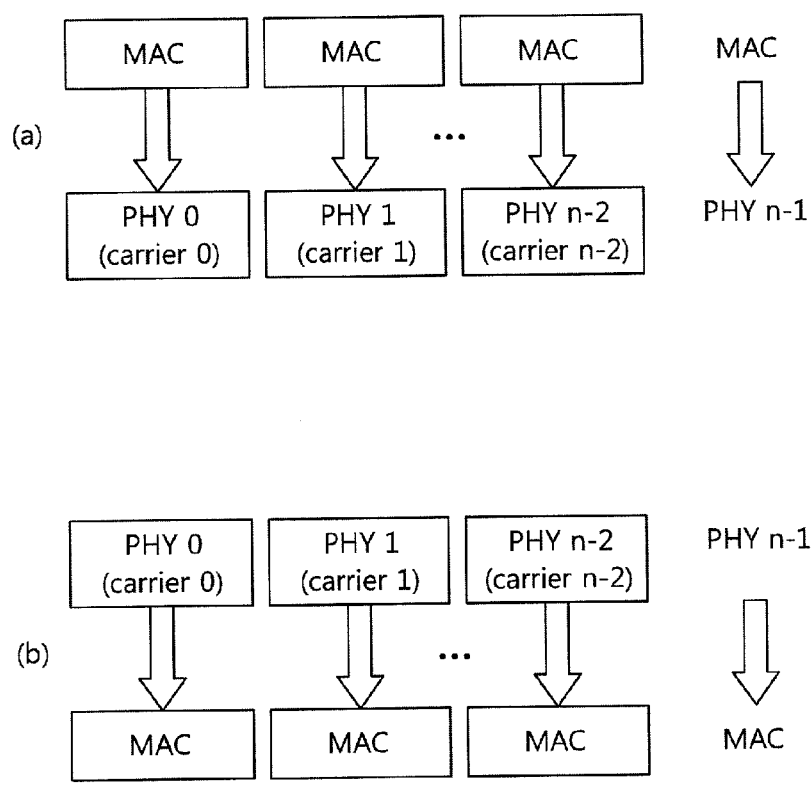
FIG. 7, including (a) and (b)
Figure 8:
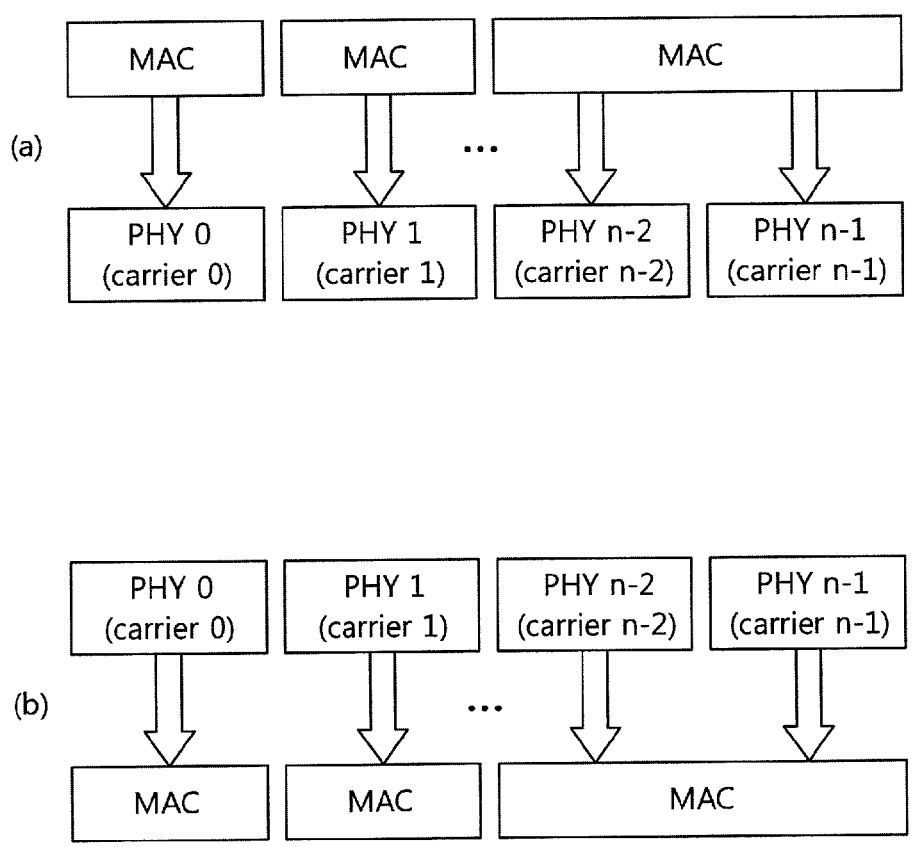
FIG. 8, including (a) and (b), are other examples of a transmitter and a receiver which constitute a carrier aggregation system.

FIG. 7, including (a) and (b), and FIG. 8, including (a) and (b), are other examples of a transmitter and a receiver which constitute a carrier aggregation system.

In the transmitter of FIG. 7(a) and the receiver of FIG. 7(b), one MAC manages only one carrier. That is, the MAC and the carrier are 1:1 mapped. In the transmitter of FIG. 8(a) and the receiver of FIG. 8(b), a MAC and a carrier are 1:1 mapped for some carriers, and regarding the remaining carriers, one MAC controls a plurality of CCs. That is, various combinations are possible based on a mapping relation between the MAC and the carrier.

The carrier aggregation system of FIG. 6 to FIG. 8 includes n carriers. The respective carriers may be contiguous to each other or may be separated from each other. The carrier aggregation system can apply both to uplink and downlink transmissions. In a TDD system, each carrier is configured to be able to perform uplink transmission and downlink transmission. In an FDD system, a plurality of CCs can be used by dividing them for an uplink usage and a downlink usage. In a typical TDD system, the number of CCs used in uplink transmission is equal to that used in downlink transmission, and each carrier has the same bandwidth. The FDD system can configure an asymmetric carrier aggregation system by allowing the number of carriers and the bandwidth to be different between uplink and downlink transmissions.

Figure 9:
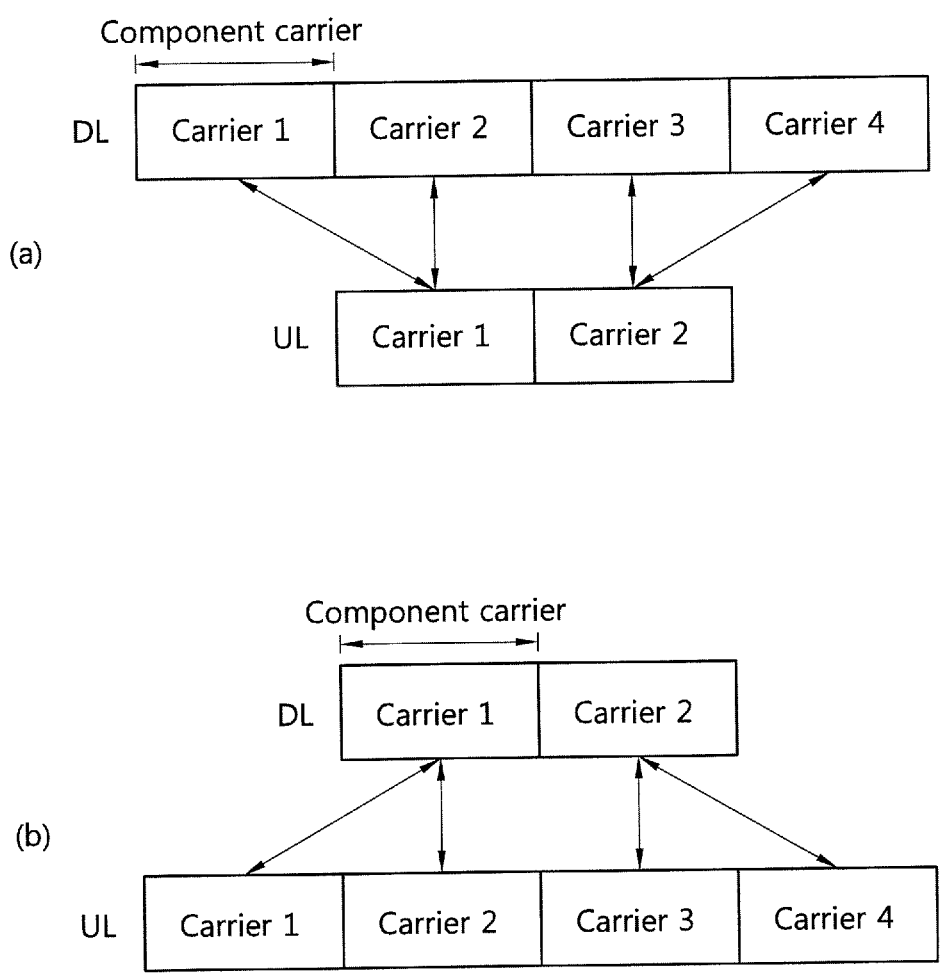
FIG. 9, including (a) and (b), shows an example of an asymmetric carrier aggregation system.

FIG. 9, including (a) and (b), shows an example of an asymmetric carrier aggregation system.

FIG. 9(a) is an example of a carrier aggregation system in which the number of downlink component carriers (CCs) is larger than the number of UL CCs. Downlink CCs #1 and #2 correspond to an UL CC #1, and DL CCs #2 and #4 correspond to an UL CC #2. FIG. 9(b) is an example of a carrier aggregation system in which the number of DL CCs is larger than the number of UL CCs. A DL CC #1 correspond to UL CCs #1 and #2, and a DL CC #2 correspond to UL CCs #2 and #4. Meanwhile, from a viewpoint of UE, there are one transport block and one hybrid automatic repeat request (HARQ) entity in each scheduled CC. Each transport block is mapped to one CC only. UE may be mapped to a plurality of CCs at the same time.

In an LTE-A system, there may be a backward-compatible carrier and a non-backward-compatible carrier. The backward-compatible carrier is a carrier capable of accessing the UEs of all LTE releases including LTE rel-8 and LTE-A. The backward-compatible carrier may be operated as a single carrier or may be operated as a CC in a carrier aggregation system. The backward-compatible carrier may be always formed of a pair of uplink and downlink in an FDD system. In contrast, the non-backward-compatible carrier cannot access the UE of a previous LTE release, but can access only the UEs of an LTE release that defines the non-backward-compatible carrier. Furthermore, the non-backward-compatible carrier may be operated as a single carrier or may be operated as a CC in a carrier aggregation system. Meanwhile, a carrier that cannot be operated as a single carrier, but that is included in a carrier aggregation including at least one carrier capable of being operated as a single carrier may be called an extension carrier.

Furthermore, in a carrier aggregation system, a type in which one or more carriers are used may include two types: a cell-specific carrier aggregation system operated by a specific cell or BS and a UE-specific carrier aggregation system operated by UE. If a cell means one backward-compatible carrier or one non-backward-compatible carrier, the term 'cell-specific' may be used for one or more carriers which include one carrier represented by a cell. Furthermore, in the type of a carrier aggregation system in an FDD system, the linkage of uplink and downlink may be determined depending on default transmission-reception (Tx-Rx) separation defined in LTE rel-8 or LTE-A.

For example, in LTE rel-8, default Tx-Rx separation is as follows. In uplink and downlink, a carrier frequency may be allocated within a range of 0~65535 according to an E-UTRA absolute radio frequency channel number (EARFCN). In downlink, a relationship between the EARFCN and a carrier frequency of a MHz unit may be represented by $F_{DL}=F_{DL\_low}+0.1(N_{DL}-N_{Offs-DL})$. In uplink, a relationship between the EARFCN and a carrier frequency of a MHz unit may be represented by $F_{UL}=F_{UL\_low}+0.1(N_{UL}-N_{Offs-UL})$. $N_{DL}$ is a downlink EARFCN, and $N_{UL}$ is an uplink EARFCN. $F_{DL-low}$, $N_{Offs-DL}$, $F_{UL-low}$, and $N_{Offs-UL}$ may be determined by Table 1.

TABLE 1

| E-UTRA Operating Band | Downlink $F_{DL\_low}$ (MHz) | $N_{Offs-DL}$ | Range of $N_{DL}$ | Uplink $F_{UL\_low}$ (MHz) | $N_{Offs-UL}$ | Range of $N_{UL}$ |
|---|---|---|---|---|---|---|
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| ... | | | | | | |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-37749 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

The basic separation of an E-TURA Tx channel and Rx channel may be determined by Table 2.

TABLE 2

| Frequency Band | TX-RX carrier centre frequency separation |
|---|---|
| 1 | 190 MHz |
| 2 | 80 MHz |
| 3 | 95 MHz |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a Gold sequence, a Kasami sequence, etc. In addition, the RS sequence may be a cyclically shifted sequence.

The uplink RS can be classified into a demodulation reference signal (DMRS) and a sounding reference signal (SRS). The DMRS is an RS used for channel estimation to demodulate a received signal. The DMRS can be combined with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not combined with PUSCH or PUCCH transmission. The same type of base sequences can be used for the DMRS and the SRS. Meanwhile, precoding applied to the DMRS in uplink multi-antenna transmission may be the same as precoding applied to the PUSCH. Cyclic shift separation is a primary scheme for multiplexing the DMRS. In an LTE-A system, the SRS may not be precoded, and may be an antenna-specific RS.

The SRS is an RS transmitted by a relay station to the BS and is an RS which is not related to uplink data or control signal transmission. In general, the SRS may be used for channel quality estimation for frequency selective scheduling in uplink or may be used for other usages. For example, the SRS may be used in power control, initial MCS selection, initial power control for data transmission, etc. In general, the SRS is transmitted in a last SC-FDMA symbol of one subframe.

An operation in UE for the transmission of an SRS is as follows. $C_{SRS}$, that is, a cell-specific SRS transmission bandwidth may be given by a higher layer, and a cell-specific SRS transmission subframe may be given by a higher layer. If UE can select a transmit antenna, the index $a(n_{SRS})$ of a UE antenna that transmits an SRS at a time $n_{SRS}$ is given $a(n_{SRS})=n_{SRS}$ mod 2 for the full sounding bandwidth or the partial sounding bandwidth when frequency hopping is not available and may be given by Equation 2 when frequency hopping is available.

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases} \quad \langle\text{Equation 2}\rangle$$

In Equation 2, $B_{SRS}$ indicates an SRS bandwidth, and $b_{hop}$ indicates a frequency hopping bandwidth. $N_b$ may be determined by a predetermined table according to $C_{SRS}$ and $B_{SRS}$.

$$K = \prod_{b'=b_{hop}}^{B_{SRS}} N_{b'}.$$

In Equation 2, $\beta$ may be determined by Equation 3.

$$\beta = \begin{cases} 1 & \text{where } K \bmod 4 = 0 \\ 0 & \text{otherwise} \end{cases} \quad \langle\text{Equation 3}\rangle$$

If one SC-FDMA symbol exists within an uplink pilot time slot (UpPTS) in a TDD system, the one SC-FDMA symbol may be used for SRS transmission. If two SC-FDMA symbols exist within an UpPTS, both the two SC-FDMA symbols may be used for SRS transmission and may be allocated to one UE at the same time.

UE does not always transmit an SRS whenever the transmission of an SRS and the transmission of PUCCH format 2/2a/2b occur within the same subframe at the same time.

If an ackNackSRS-SimultaneousTransmission parameter is false, UE does not always transmit an SRS whenever the transmission of an SRS and the transmission of a PUCCH that carries ACK/NACK and/or a positive SR are performed in the same subframe. Furthermore, if an ackNackSRS-SimultaneousTransmission parameter is true, UE uses a shortened PUCCH format and transmits a PUCCH that carries ACK/NACK and/or a positive SR and an SRS at the same time when the transmission of the SRS and the transmission of the PUCCH that carries ACK/NACK and/or a positive SR are configured in the same subframe. That is, if a PUCCH that carries ACK/NACK and/or a positive SR and an SRS is configured within an SRS subframe configured in a cell specific manner. UE uses a shortened PUCCH format and transmits the PUCCH that carries ACK/NACK and/or a positive SR and the SRS at the same time. If SRS transmission overlaps with a physical random access channel (PRACH) region for the preamble format 4 or exceeds the range of an uplink system bandwidth configured in a cell, UE does not transmit an SRS.

ackNackSRS-SimultaneousTransmission, that is, a parameter given by a higher layer, determines whether UE supports the simultaneous transmission of a PUCCH that carries ACK/NACK and an SRS within one subframe. If UE is configured to transmit a PUCCH that carries ACK/NACK and an SRS within one subframe at the same time, the UE may transmits the ACK/NACK and the SRS in a cell-specific SRS subframe. Here, a shortened PUCCH format may be used, and the transmission of ACK/NACK or an SR corresponding to a position where the SRS is transmitted is punctured. The shortened PUCCH format is used in the cell-specific SRS subframe even when the UE does not transmit the SRS in the relevant subframe. If UE is configured not to transmit a PUCCH that carries ACK/NACK and an SRS within one subframe at the same time, the UE may use common PUCCH formats 1/1a/1b in order to transmit the ACK/NACK and the SR.

Tables 3 and 4 are examples of a UE-specific SRS configuration that indicates $T_{SRS}$, that is, an SRS transmission periodicity, and $T_{offset}$, that is, an SRS subframe offset. The SRS transmission periodicity $T_{SRS}$ may be determined as one of {2, 5, 10, 20, 40, 80, 160, 320} ms.

Table 3 is an example of an SRS configuration in an FDD system.

TABLE 3

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 4 is an example of an SRS configuration in a TDD system.

TABLE 4

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

In the case of $T_{SRS}>2$ in a TDD system, an SRS subframe in an FDD system satisfy $(10*n_f+k_{SRS}-T_{offset})$ mod $T_{SRS}=0$. $n_f$ indicates a frame index, and $k_{SRS}$ is a subframe index within a frame in an FDD system. In the case of $T_{SRS}=2$ in a TDD system, 2 SRS resources may be configured within a half frame including at least one uplink subframe, and an SRS subframe satisfies $(k_{SRS}-T_{offset})$ mod $5=0$.

In a TDD system, $k_{SRS}$ may be determined by Table 5.

TABLE 5

| | Subframe index n | | | | | | | | | |
|---|---|---|---|---|---|---|---|---|---|---|
| | | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

Meanwhile, UE does not always transmit an SRS if the transmission of the SRS and the transmission of a PUSCH, corresponding to the retransmission of the same transport block as part of a random access response grant or a contention-based random access procedure, are performed within the same subframe.

Channel coding for PUSCH transmission is described below.

Figure 10:
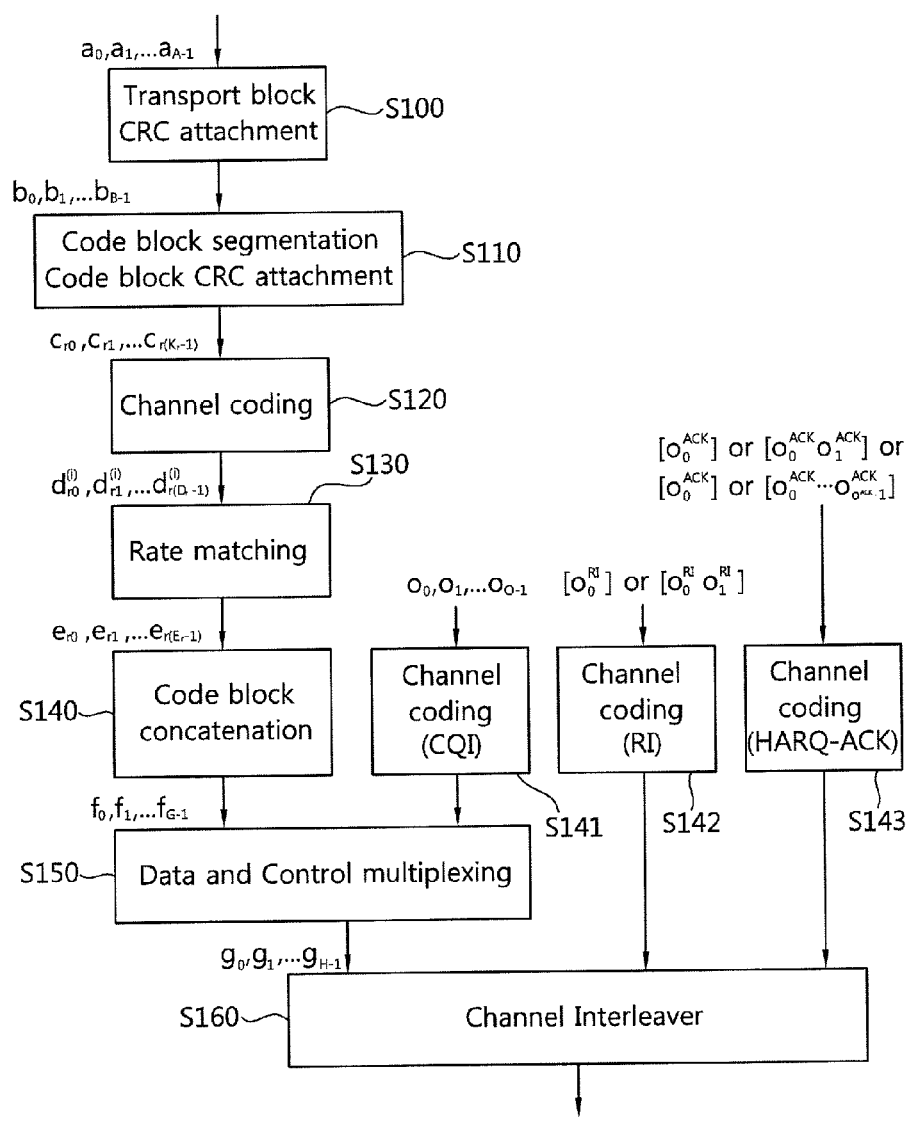
FIG. 10 is an example of a process of processing an uplink shared channel (UL-SCH) transport channel.

FIG. 10 is an example of a process of processing an uplink shared channel (UL-SCH) transport channel. A coding unit is reached in the form of one maximum transport block at each transmit time interval (TTI).

Referring to FIG. 10, at step S100, a cyclic redundancy check (CRC) is attached to a transport block. When the CRC is attached, error detection for an UL-SCH transport block can be supported. All transport blocks may be used to calculate a CRC parity bit. Bits within a transport block transferred in a layer 1 are $a_0, \ldots, a_{A-1}$, and parity bits may be represented by $p_0, \ldots, p_{L-1}$. The size of the transport block is A, and the size of the parity bit is L. a0, that is, the information bit of the smallest order, may be mapped to the most significant bit (MSB) of the transport block.

At step S110, the transport block to which the CRC is attached is segmented into a plurality of code blocks, and a CRC is attached to each of the code blocks. Bits before they are segmented into the code blocks may be represented by $b_0, \ldots, b_{B-1}$, and B is the number of bits within the transport block including the CRC. Bits after they are segmented into the code blocks may be represented by $c_{r0}, \ldots, c_{r(Kr-1)}$, r is a code block number, and Kr is the number of bits of the code block number r.

At step S120, channel coding is performed on each of the code blocks. The total number of code blocks is C, and the channel coding may be performed on each code block according to a turbo coding scheme. The bits on which the channel coding has been performed may be represented by $d_{r0}^{(i)}, \ldots, d_{r(Dr-1)}^{(i)}$, and $D_r$ is the number of bits of an $i^{th}$ coded stream of the code block number r. $D_r=Kr+4$, and i is a coded stream index and may be 0, 1 or 2.

At step S130, rate matching is performed on each code block on which the channel coding has been performed. The rate matching may be performed for code block individually.

Bits after the rate matching is performed may be represented by $e_{r0}, \ldots, e_{r(E_r-1)}$, r is a code block number, and $E_r$ is the number of rate matched bits of the code block number r.

At step S140, the code blocks on which the rate matching has been performed are concatenated. Bits after the code blocks are concatenated may be represented by $f_0, \ldots, f_{G-1}$, and G is the total number of coded transmission bits other than bits that are used to transmit control information. Here, the control information may be multiplexed with UL-SCH transmission.

At steps S141 to S143, channel coding is performed on the control information. The control information may include channel quality information (CQI) and/or CQI including a precoding matrix indicator (PMI), hybrid automatic repeat request (HARQ)-acknowledgement (ACK), and a rank indicator (RI). Or, it is hereinafter assumed that the CQI includes a PMI. A different coding rate is applied to each piece of control information depending on the number of different coding symbols. When the control information is transmitted in a PUSCH, channel coding on CQI, an RI, and HARQ-ACK is independently performed. In the present embodiment, it is assumed that the channel coding is performed on CQI at step S141, the channel coding is performed on an RI at step S142, and the channel coding is performed on HARQ-ACK at step S143, but not limited thereto.

In a TDD system, two types of HARQ-ACK feedback modes of HARQ-ACK bundling and HARQ-ACK multiplexing may be supported by a higher layer. In the TDD HARQ-ACK bundling mode, HARQ-ACK includes one or two information bits. In the TDD HARQ-ACK multiplexing mode, HARQ-ACK includes one to four information bits.

If UE transmits HARQ-ACK bits or RI bits, the number of coded symbols Q' may be determined by Equation 4.

$$Q' = \min \left( \left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH} \right) \quad \langle \text{Equation 4} \rangle$$

In Equation 4, O is the number of HARQ-ACK bits or RI bits, and $M_{sc}^{PUSCH}$ is a bandwidth scheduled for PUSCH transmission in the current subframe of a transport block which is represented by the number of subcarriers. $N_{symb}^{PUSCH-initial}$ is the number of SC-FDMA symbols in each subframe for initial PUSCH transmission in the same transport block and may be determined as $N_{symb}^{PUSCH-initial}=(2*(N_{symb}^{UL}-1)-N_{SRS})$. If UE is configured to transmit a PUSCH and an SRS in the same subframe for initial transmission or the allocation of PUSCH resources for initial transmission partially overlaps with a bandwidth allocated for the transmission of a cell-specific SRS subframe and SRS, $N_{SRS}=1$. In the remaining cases, $N_{SRS}=0$. $M_{sc}^{PUSCH-initial}$, C, and Kr may be obtained from an initial PDCCH for the same transport block. If there is no DCI format 0 within the initial PDCCH for the same transport block, $M_{sc}^{PUSCH-initial}$, C, and Kr may be obtained from a PDCCH that has been semi-persistently allocated most recently when the initial PUSCH for the same transport block has been semi-persistently scheduled and may be obtained from a random access response grant for the same transport block when a PUSCH has been initiated from a random access response grant.

In HARQ-ACK transmission, $Q_{ACK}=Q_m*Q'$, $\beta_{offset}^{PUSCH}=\beta_{offset}^{HARQ-ACK}$. Furthermore, in RI transmission, $Q_{RI}=Q_m*Q'$, $\beta_{offset}^{PUSCH}=\beta_{offset}^{RI}$.

In HARQ-ACK transmission, ACK may be encoded into '1' from a binary number, and NACK may be encoded into '0' from a binary number. If HARQ-ACK is $[o_0^{ACK}]$ including 1-bit information, the HARQ-ACK may be encoded according to Table 6.

TABLE 6

| $Q_m$ | Encoded HARQ-ACK |
|---|---|
| 2 | $[o_0^{ACK}\ y]$ |
| 4 | $[o_0^{ACK}\ y\ x\ x]$ |
| 6 | $[o_0^{ACK}\ y\ x\ x\ x\ x]$ |

If HARQ-ACK is $[o_0^{ACK}\ o_1^{ACK}]$ including 2-bit information, the HARQ-ACK may be encoded according to Table 7. In Table 7, $o_2^{ACK}=(o_0^{ACK}+o_1^{ACK})\mod 2$.

TABLE 7

| $Q_m$ | Encoded HARQ-ACK |
|---|---|
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ |

In Tables 6 and 7, x and y indicate placeholders for scrambling HARQ-ACK bits for a method of maximizing the Euclidean distance of a modulation symbol for carrying HARQ-ACK information.

When HARQ-ACK includes one or two information bits, in the case of the FDD or TDD HARQ-ACK multiplexing mode, a bit sequence $q_0^{ACK}, \ldots, q_{Q_{ACK}-1}^{ACK}$ may be obtained by concatenating a plurality of encoded HARQ-ACK block. Here, $Q_{ACK}$ is the total number of encoded bits within all the encoded HARQ-ACK blocks. The concatenation of the last HARQ-ACK block may be partially performed in order to match the total length of the bit sequence with $Q_{ACK}$.

In the case of the TDD HARQ-ACK bundling mode, a bit sequence $\tilde{q}_0^{ACK}, \ldots, \tilde{q}_{Q_{ACK}-1}^{ACK}$ may be obtained by concatenating a plurality of encoded HARQ-ACK blocks. Here, $Q_{ACK}$ is the total number of encoded bits within all the encoded HARQ-ACK blocks. The concatenation of the last HARQ-ACK block may be partially performed in order to match the total length of the bit sequence with $Q_{ACK}$. A scrambling sequence $[w_0^{ACK}\ w_1^{ACK}\ w_2^{ACK}\ w_3^{ACK}]$ may be determined by Table 8.

TABLE 8

| i | $[w_0^{ACK}\ w_1^{ACK}\ w_2^{ACK}\ w_3^{ACK}]$ |
|---|---|
| 0 | [1 1 1 1] |
| 1 | [1 0 1 0] |
| 2 | [1 1 0 0] |
| 3 | [1 0 0 1] |

If HARQ-ACK is $[o_0^{ACK}\ o_{O_{ACK}-1}^{ACK}]$ including two or higher information bits ($O^{ACK}>2$), a bit sequence $q_0^{ACK}, \ldots q_{Q_{ACK}-1}^{ACK}$ may be obtained by Equation 5.

$$q_i^{ACK} = \sum_{n=0}^{O^{ACK}-1} (o_n^{ACK} \cdot M_{(i\mod 32),n}) \mod 2 \quad \langle \text{Equation 5} \rangle$$

In Equation 5, $i=0, \ldots, Q_{ACK}-1$.

In RI transmission, the size of a bit of RI feedback corresponding to PDSCH transmission may be determined by assuming a maximum number of layers according to the antenna configuration of a BS and UE. If an RI is $[o_0^{RI}]$ including 1-bit information, the RI may be encoded according to Table 9.

TABLE 9

| $Q_m$ | Encoded RI |
|---|---|
| 2 | [o0RI y] |
| 4 | [o0RI y x x] |
| 6 | [o0RI y x x x x] |

In Table 9, the mapping of $[o_0^{RI}]$ and an RI may be given by Table 10.

TABLE 10

| o0RI | RI |
|---|---|
| 0 | 1 |
| 1 | 2 |

If an RI is $[o_0^{RI}\ o_1^{RI}]$ including 2-bit information, $o_0^{RI}$ corresponds to an MSB from the 2-bit information, and $o_1^{RI}$ corresponds to the least significant bit (LSB) of 2 bits, the RI may be encoded according to Table 11. In Table 11, $o_2^{RI} = (o_0^{RI} + o_1^{RI}) \bmod 2$.

TABLE 11

| $Q_m$ | Encoded RI |
|---|---|
| 2 | $[o_0^{RI}\ o_1^{RI}\ o_2^{RI}\ o_0^{RI}\ o_1^{RI}\ o_2^{RI}]$ |
| 4 | $[o_0^{RI}\ o_1^{RI}\ x\ x\ o_2^{RI}\ o_0^{RI}\ x\ x\ o_1^{RI}\ o_2^{RI}\ x\ x]$ |
| 6 | $[o_0^{RI}\ o_1^{RI}\ x\ x\ x\ x\ o_2^{RI}\ o_0^{RI}\ x\ x\ x\ x\ o_1^{RI}\ o_2^{RI}\ x\ x\ x\ x]$ |

In Table 11, the mapping of $[o_0^{RI}\ o_1^{RI}]$ and an RI may be given by Table 12.

TABLE 12

| $O_0^{RI} \cdot O_1^{RI}$ | RI |
|---|---|
| 0, 0 | 1 |
| 0, 1 | 2 |
| 1, 0 | 3 |
| 1, 1 | 4 |

In Tables 6 and 7, x and y indicate placeholders for scrambling HARQ-ACK bits for a method of maximizing the Euclidean distance of a modulation symbol for carrying HARQ-ACK information.

A bit sequence $q_0^{RI}, \ldots, q_{Q_{RI}-1}^{RI}$ may be obtained by concatenating a plurality of encoded RI blocks. Here, $Q_{RI}$ is the total number of encoded bits within all the encoded RI blocks. The concatenation of the last RI block may be partially performed in order to match the total length of the bit sequence with $Q_{RI}$.

If UE transmits CQI bits, the number of coded symbols Q' may be determined by Equation 6.

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, M_{sc}^{PUSCH} \cdot N_{symb}^{PUSCH} - \frac{Q_{RI}}{Q_m}\right) \quad \langle\text{Equation 6}\rangle$$

In Equation 6, O is the number of CQI bits, and L is the number of CRC bits which is given 0 when O≤11 and given 8 in other cases. Furthermore, $Q_{CQI}=Q_m*Q'$, and $\beta_{offset}^{PUSCH}=\beta_{offset}^{CQI}$. If an RI is not sent, $Q_{RI}=0$. $M_{sc}^{PUSCH-initial}$, C and $K_r$ may be obtained from an initial PDCCH for the same transport block. If the DCI format 0 does not exist within the initial PDCCH for the same transport block, $M_{sc}^{PUSCH-initial}$, C, and $K_r$ may be obtained from a PDCCH that has been semi-persistently allocated most recently when the initial PUSCH for the same transport block has been semi-persistently scheduled and may be obtained from a random access response grant for the same transport block when a PUSCH has been initiated from a random access response grant. $N_{symb}^{PUSCH-initial}$ is the number of SC-FDMA symbols in each subframe for the transmission of the initial PUSCH in the same transport block. Regarding UL-SCH data information, $G=N_{symb}^{PUSCH}*M_{sc}^{PUSCH}*Q_m-Q_{CQI}-Q_R$. Here, $M_{sc}^{PUSCH}$ is a bandwidth scheduled for PUSCH transmission in the current subframe of a transport block which is represented by the number of subcarriers. $N_{symb}^{PUSCH}=(2*(N_{symb}^{UL}-1)-N_{SRS})$. If UE is configured to transmit a PUSCH and an SRS in the same subframe for initial transmission or the allocation of PUSCH resources for the initial transmission partially overlaps with a bandwidth allocated to the transmission of a cell-specific SRS subframe and SRS, $N_{SRS}=1$. In other cases, $N_{SRS}=0$.

In CQI transmission, when the size of a payload is smaller than 11 bits, the channel coding of CQI information is performed based on an input sequence $o_0, \ldots, o_{O-1}$. When the size of a payload is greater than 11 bits, CRC addition, channel coding, and rate matching are performed on the CQI information. The input sequence of the CRC attachment process is $o_0, \ldots, o_{O-1}$. An output sequence to which the CRC has been attached becomes the input sequence of the channel coding process, and the output sequence of the channel coding process becomes the input sequence of the rate matching process. The output sequence of the final channel coding on the CQI information may be represented by $q_0, \ldots, q_{QCQI-1}$.

At step S150, multiplexing is performed on the data and the control information. Here, the HARQ-ACK information exists both in the two slots of a subframe, and it may be mapped to resources adjacent to a DMRS. When the data and the control information are multiplexed, they may be mapped to different modulation symbols. Meanwhile, if one or more UL-SCH transport blocks are transmitted in the subframe of an uplink cell, CQI information may be multiplexed with data on an UL-SCH transport block having the highest modulation and coding scheme (MCS).

At step S160, channel interleaving is performed. The channel interleaving may be performed in connection with PUSCH resource mapping. Modulation symbols may be mapped to a transmit waveform in a time-first mapping manner through the channel interleaving. The HARQ-ACK information may be mapped to resources adjacent to an uplink DMRS, and the RI information may be mapped to the periphery of resources used by the HARQ-ACK information.

A proposed SRS transmission method is described below in connection with embodiments.

The SRS transmission method may be divided into two types: a periodic SRS transmission method of transmitting an SRS periodically according to an SRS parameter received by radio resource control (RRC) signaling, which is a method defined in LTE rel-8, and an aperiodic SRS transmission method of transmitting an SRS whenever the SRS is necessary based on a message dynamically triggered by a BS. In LTE-A, the aperiodic SRS transmission method may be introduced.

In the periodic SRS transmission method and the aperiodic SRS transmission method, an SRS may be transmitted in a UE-specific SRS subframe determined in a UE-specific manner. In the periodic SRS transmission method defined in LTE rel-8, a cell-specific SRS subframe is periodically configured by a cell-specific SRS parameter, and a periodic SRS is transmitted in a periodic UE-specific SRS subframe that is configured by a UE-specific SRS parameter from the cell-specific SRS subframe. Here, the periodic UE-specific SRS subframe may be a subset of the cell-specific SRS subframe. The cell-specific SRS parameter may be given by a higher layer. In the aperiodic SRS transmission method, an aperiodic SRS may be transmitted in an aperiodic UE-specific SRS subframe determined by a UE-specific aperiodic SRS parameter. The UE-specific SRS subframe of the aperiodic SRS transmission method may be a subset of the cell-specific SRS subframe as defined in LTE rel-8. Or, the aperiodic UE-specific SRS subframe may be identical with the cell-specific SRS subframe. Like the cell-specific SRS parameter, the UE-specific aperiodic SRS parameter may be given by a higher layer. The UE-specific aperiodic SRS subframe may be determined by the periodicity of the subframe and the offset of the subframe in Table 3 or Table 4 described above.

In an SRS subframe determined in a UE-specific manner or determined in a cell specific manner, the operation of UE when a PUSCH and an aperiodic SRS are configured so that they are transmitted at the same time has not yet been defined. Accordingly, there is a need for a data transmission method as a new operation of UE when a PUSCH and an aperiodic SRS are configured so that they are transmitted at the same time.

Figure 11:
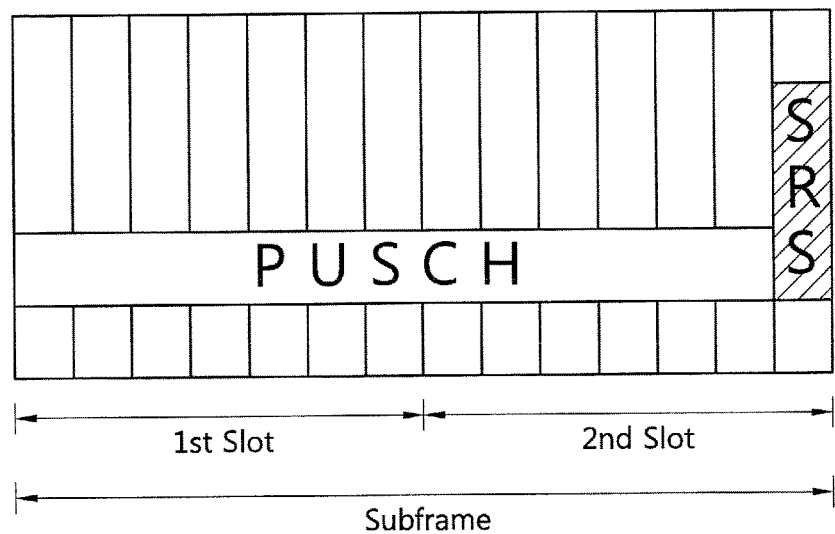
FIG. 11 is an example of a configuration regarding the proposed method of transmitting data in an SRS subframe.

FIG. 11 is an example of a configuration regarding the proposed method of transmitting data in an SRS subframe.

In FIG. 11, an SRS subframe is any one of aperiodic UE-specific SRS subframes determined in a UE-specific manner. Or, if the aperiodic UE-specific SRS subframe is identical with an SRS subframe determined in a cell specific manner, the SRS subframe of FIG. 11 is any one of SRS subframes determined in a cell specific manner. The last SC-FDMA symbol of the SRS subframe is allocated for SRS transmission, and a PUSCH may be allocated to the remaining SC-FDMA symbols and data may be transmitted. In the last SC-FDMA symbol of the SRS subframe, a bandwidth occupied by the SRS may be the entire system bandwidth and may be a narrow band or partial bandwidth. Furthermore, the bandwidth occupied by the SRS may be a UE-specific SRS bandwidth defined in LTE rel-8/9 and may be an SRS bandwidth newly configured in LTE-A. In the remaining SC-FDMA symbols, a bandwidth occupied by a PUSCH is also not limited.

The SRS and uplink data through a PUSCH are transmitted in the SRS subframe at the same time. Here, the PUSCH may be subject to rate matching except the last SC-FDMA symbol allocated to the SRS. The transmission of a PUSCH in a relevant SRS subframe may be subject to rate matching so that the PUSCH is transmitted in the remaining SC-FDMA symbols in which the SRS is not transmitted without a limitation to a relationship between the transmission bandwidth of the SRS and a bandwidth occupied by the PUSCH. As the PUSCH is subject to the rate matching, the data rate corresponding to one SC-FDMA symbol when data is transmitted through the PUSCH is reduced, and reliability and coverage of SRS transmission can be improved.

Or, a PUSCH allocated to the last SC-FDMA symbol may be punctured without performing rate matching on the PUSCH. Furthermore, in FIG. 11, the case where the SRS is transmitted in the last SC-FDMA symbol allocated to the SRS has been assumed, but the present invention may also be applied to the case where the SRS subframe is allocated by a UE-specific SRS parameter and the SRS is not actually transmitted. That is, in an aperiodic UE-specific SRS subframe or cell-specific SRS subframe, a PUSCH may be subject to rate matching except the last SC-FDMA symbol allocated to an SRS irrespective of whether an SRS has been transmitted or not.

Figure 12:
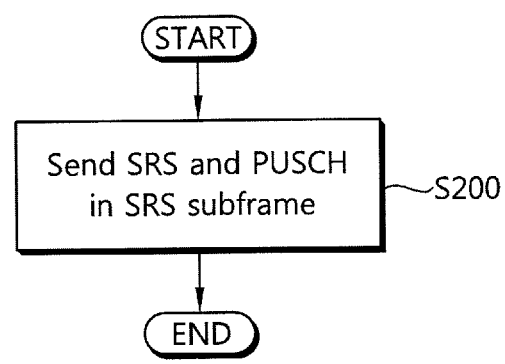
FIG. 12 is an embodiment of the proposed data transmission method.

FIG. 12 is an embodiment of the proposed data transmission method. At step S100, UE transmits uplink data in an SRS subframe on an SRS and a PUSCH. Here, an SC-FDMA symbol allocated to the SRS and an SC-FDMA symbol allocated to the PUSCH do not overlap with each other within the SRS subframe, and rate matching is performed on the PUSCH.

Figure 13:
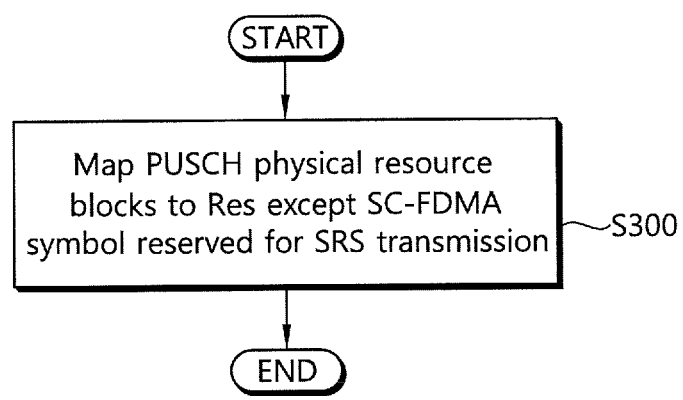
FIG. 13 is an embodiment of the proposed resource mapping method.

FIG. 13 is an embodiment of the proposed resource mapping method. At step S100, UE allocates PUSCH resources except reserved SC-FDMA symbols in order to transmit an aperiodic SRS. Physical resource blocks allocated to transmit a PUSCH are mapped to relevant resource elements (REs) within the subframe. The subframe may be any one of aperiodic UE-specific SRS subframes determined in a UE-specific manner or may be any one of SRS subframes determined in a cell specific manner.

The proposed resource mapping method may be applied to channel coding on the PUSCH transmission of FIG. 10. More particularly, in Equation 4 that determines the number of symbols coded when HARQ-ACK and/or an RI are transmitted, $N_{symb}^{PUSCH\text{-}initial}$ may be changed. That is, $N_{symb}^{PUSCH\text{-}initial}$ is the number of SC-FDMA symbols in each subframe for initial PUSCH transmission in the same transport block and may be determined as $N_{symb}^{PUSCH\text{-}initial}=(2*(N_{symb}^{UL}-1)-N_{SRS})$. Here, if UE is configured to transmit a PUSCH and an SRS in the same subframe for initial transmission, the allocation of PUSCH resources for the initial transmission partially overlaps with a bandwidth allocated for the transmission of a UE-specific SRS subframe and an SRS, or UE transmits a PUSCH in a cell-specific SRS subframe when aperiodic SRS transmission is configured, $N_{SRS}=1$. In the remaining cases, $N_{SRS}=0$. Or, in Equation 6 that determines the number of symbols coded when CQI is transmitted, $N_{symb}^{PUSCH}$ may be changed. That is, $N_{symb}^{PUSCH}$ may be determined as $N_{symb}^{PUSCH}=(2*(N_{symb}^{UL}-1)-N_{SRS})$. Here, if UE is configured to transmit a PUSCH and an SRS in the same subframe for initial transmission, the allocation of PUSCH resources for the initial transmission partially overlaps with a bandwidth allocated for the transmission of a UE-specific SRS subframe and an SRS, or UE transmits a PUSCH in a cell-specific SRS subframe when aperiodic SRS transmission is configured, $N_{SRS}=1$. In the remaining cases, $N_{SRS}=0$.

Figure 14:
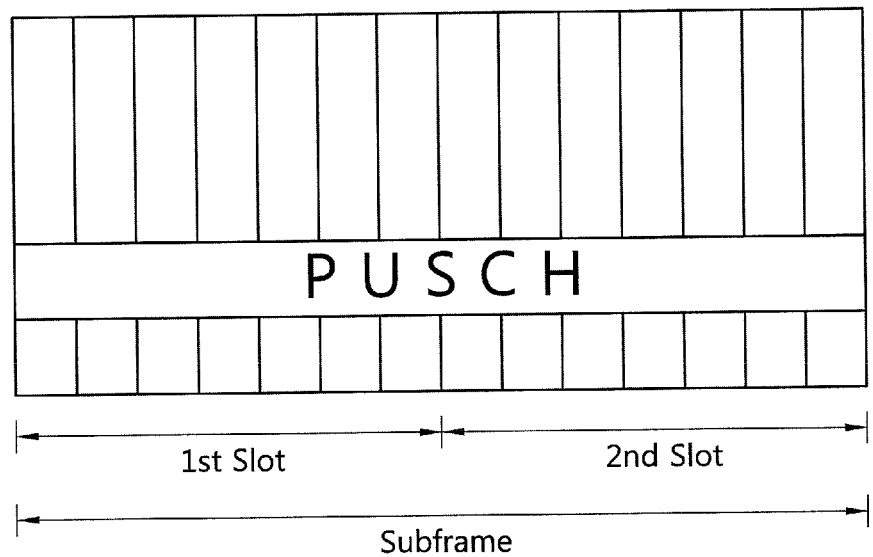
FIG. 14 is another example of a configuration regarding the proposed method of transmitting data in an SRS subframe.

FIG. 14 is another example of a configuration regarding the proposed method of transmitting data in an SRS subframe. Referring to FIG. 14, uplink data is transmitted through a PUSCH over the entire SRS subframe, and the transmission of an SRS is dropped. Accordingly, the data rate of PUSCH transmission and quality of service (QoS) of data transmitted through a PUSCH can be guaranteed.

Or, the rate matching of a PUSCH in FIG. 11 and the dropping of an SRS in FIG. 14 may be determined through an RRC message. Here, either the PUSCH rate matching method or the SRS dropping method may be selected in response to the RRC message that indicates the simultaneous transmission of a PUSCH and a PUCCH. Or, either the PUSCH rate matching method or the SRS dropping method may be selected in response to a newly defined RRC message.

Figure 15:
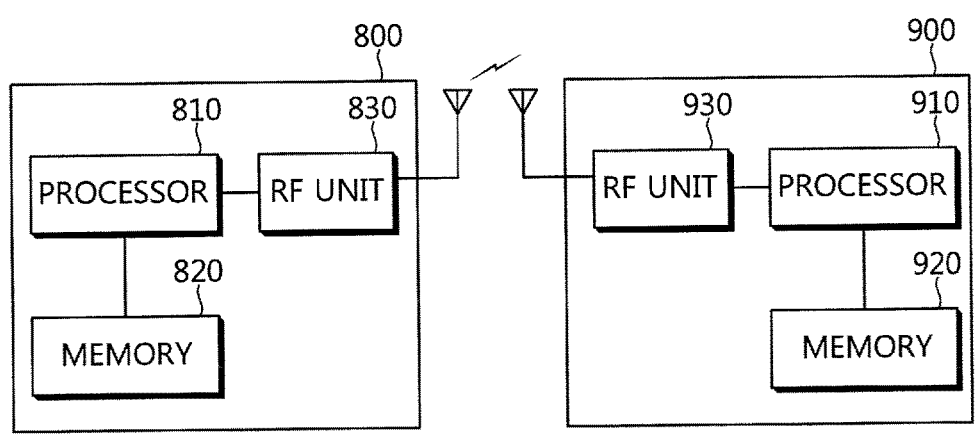
FIG. 15 is a block diagram of a BS and UE in which the embodiments of the present invention are embodied.

FIG. 15 is a block diagram of a BS and UE in which the embodiments of the present invention are embodied.

The BS 800 includes a processor 810, memory 820, and a radio frequency (RF) unit 830. The processor 810 implements the proposed functions, processes and/or methods. The layers of a radio interface protocol may be implemented by the processor 810. The memory 820 is connected to the processor 810, and it stores various pieces of information for driving the processor 810. The RF unit 830 is connected to the processor 810, and it transmits and/or receives radio signals.

The UE 900 includes a processor 910, memory 920, and an RF unit 930. The RF unit 930 is connected to the processor 910, and it transmits uplink data on an SRS and a PUSCH in an SRS subframe. The processor 910 implements the proposed functions, processes and/or methods. The layers of a radio interface protocol may be implemented by the processor 910. The memory 920 is connected to the processor 910, and its stores various pieces of information for driving the processor 910.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910. In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting, by a user equipment (UE), uplink data in a wireless communication system, the method comprising:
    mapping uplink data to resource elements corresponding to a physical uplink shared channel (PUSCH) in a UE-specific aperiodic sounding reference signal (SRS) subframe,
    wherein the UE-specific aperiodic SRS subframe includes a single carrier frequency division multiple access (SC-FDMA) symbol reserved for an aperiodic SRS,
    wherein the aperiodic SRS is selectively transmitted in the reserved SC-FDMA symbol, and the aperiodic SRS is transmitted in the reserved SC-FDMA symbol when triggered by a base station, and
    wherein the uplink data is mapped to SC-FDMA symbols other than the SC-FDMA symbol reserved for the aperiodic SRS in the UE-specific aperiodic SRS subframe in a case when the aperiodic SRS is not transmitted in the reserved SC-FDMA symbol; and
    transmitting the mapped uplink data to the base station via the UE-specific aperiodic SRS subframe.

2. The method of claim 1, wherein the aperiodic SRS is transmitted to the base station in the UE-specific aperiodic SRS subframe.

3. The method of claim 1, wherein the UE-specific aperiodic SRS subframe is one of a plurality of UE-specific subframes configured by a UE-specific aperiodic SRS parameter.

4. The method of claim 3, wherein the UE-specific aperiodic SRS parameter indicates a periodicity and an offset of the plurality of UE-specific SRS subframes.

5. The method of claim 3, wherein the UE-specific aperiodic SRS parameter is given by a higher layer.

6. The method of claim 1, wherein the SC-FDMA symbol reserved for the aperiodic SRS is a last SC-FDMA symbol of the UE-specific aperiodic SRS subframe.

7. The method of claim 1, wherein the PUSCH is subject to rate matching except the SC-FDMA symbol reserved for the aperiodic SRS, and
    wherein the rate matching is performed by determining, by the UE, a number of coded modulation symbols.

8. The method of claim 7, wherein the number of coded modulation symbols is determined based on a number of SC-FDMA symbols per subframe for the PUSCH.

9. The method of claim 8, wherein the number of SC-FDMA symbols per subframe for the PUSCH is determined based on Equation:

$$N_{symb}^{PUSCH\text{-}initial}=(2\cdot(N_{symb}^{UL}-1)-N_{SRS})$$

where $N_{symb}^{UL}$ denotes a number of SC-FDMA symbols in each slot in the UE-specific aperiodic SRS subframe, and $N_{SRS}=1$.

10. A user equipment (UE) comprising:
    a memory;
    a radio frequency (RF) unit; and
    a processor coupled to the memory and the RF unit, and configured to:
        map uplink data to resource elements corresponding to a physical uplink shared channel (PUSCH) in a UE-specific aperiodic sounding reference signal (SRS) subframe, wherein the UE-specific aperiodic SRS subframe includes a single carrier frequency division multiple access (SC-FDMA) symbol reserved for an aperiodic SRS, wherein the aperiodic SRS is selectively transmitted in the reserved SC-FDMA symbol, and the aperiodic SRS is transmitted in the reserved SC-FDMA symbol when triggered by a base station, and wherein the uplink data is mapped to SC-FMDA symbols other than the SC-FDMA symbol reserved for the aperiodic SRS in the UE-specific aperiodic SRS subframe in a case when the aperiodic SRS is not transmitted in the reserved SC-FDMA symbol, and control the RF unit to transmit the mapped uplink data to the base station via the UE-specific aperiodic SRS subframe.

11. The UE of claim 10, wherein the aperiodic SRS is transmitted to the base station in the UE-specific aperiodic SRS subframe.

12. The UE of claim 10, wherein the UE-specific aperiodic SRS subframe is one of a plurality of UE-specific subframes configured by a UE-specific aperiodic SRS parameter.

13. The UE of claim 12, wherein the UE-specific aperiodic SRS parameter indicates a periodicity and an offset of the plurality of UE-specific SRS subframes.

14. The UE of claim 12, wherein the UE-specific aperiodic SRS parameter is given by a higher layer.

15. The UE of claim 10, wherein the SC-FDMA symbol reserved for the aperiodic SRS is a last SC-FDMA symbol of the UE-specific aperiodic SRS subframe.

16. The UE of claim 10, wherein the PUSCH is subject to rate matching except the SC-FDMA symbol reserved for the aperiodic SRS, and wherein the rate matching is performed by determining, by the UE, a number of coded modulation symbols.

17. The UE of claim 16, wherein the number of coded modulation symbols is determined based on a number of SC-FDMA symbols per subframe for the PUSCH.

18. The UE of claim 17, wherein the number of SC-FDMA symbols per subframe for the PUSCH is determined based on Equation:

$$N_{symb}^{PUSCH\text{-}initial} = (2 \cdot (N_{symb}^{UL} - 1) - N_{SRS})$$

where $N_{symb}^{UL}$ denotes a number of SC-FDMA symbols in each slot in the UE-specific aperiodic SRS subframe, and $N_{SRS}=1$.

* * * * *